United States Patent
Di Camillo et al.

(10) Patent No.: US 7,171,159 B2
(45) Date of Patent: Jan. 30, 2007

(54) TRANSMISSION POWER CONTROL IN A SATELLITE COMMUNICATION SYSTEM

(75) Inventors: Nicholas Francis Di Camillo, Torrance, CA (US); Michael Steven Muñoz, Redondo Beach, CA (US); Garrick Jon Harmon, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 525 days.

(21) Appl. No.: 10/601,662

(22) Filed: Jun. 24, 2003

(65) Prior Publication Data

US 2004/0266470 A1    Dec. 30, 2004

(51) Int. Cl.
H04B 7/185    (2006.01)
H04B 7/212    (2006.01)
H04Q 7/20    (2006.01)

(52) U.S. Cl. .................... 455/13.4; 455/522; 455/12.1; 370/347

(58) Field of Classification Search ................. 455/522, 455/69, 127.1, 127.3, 68, 13.4, 12.1; 370/347, 370/442

See application file for complete search history.

(56) References Cited

U.S. PATENT DOCUMENTS 5,574,747 A * 11/1996 Lomp .......................... 375/144
5,924,015 A * 7/1999 Garrison et al. ........... 455/13.4
5,974,041 A * 10/1999 Kornfeld et al. ............ 370/342
6,366,776 B1 * 4/2002 Wright et al. ............... 455/427
6,430,418 B1 * 8/2002 Nivens et al. .............. 455/522
6,763,006 B1 * 7/2004 Lockett ....................... 370/318
6,980,824 B2 * 12/2005 Hsu et al. .................... 455/522
2004/0224633 A1 * 11/2004 Coromina et al. ......... 455/13.3

* cited by examiner

Primary Examiner—Tilahun Gesesse
(74) Attorney, Agent, or Firm—Tarolli, Sundheim, Covell & Tummino LLP

(57) ABSTRACT

A communications system, a communications station, a method of controlling the power to transmitters in a communications station, and a storage medium storing instructions for controlling power to a communications satellite. The power consumed by each transmitter is determined, and desired power settings are determined. The power consumed is compared with the desired power settings. If the power settings are not proper, then it is determined whether the desired power is available. If so, then the power settings are adjusted. If not, then load priorities of the transmitters are determined, and if there is sufficient power to provide for the determined load priorities, the power settings are adjusted. The communications station includes variable gain amplifiers (26-1, 26-2, . . . 26-n), to provide intermediate signals; high gain amplifiers (28-1, 28-2, . . . 28-n) for amplifying the intermediate signals to output signals; monitoring power supplies (36-1, 36-2, . . . 36-n) for determining the power provided by the high gain amplifiers, and a power profile processor (32) for adjusting the gain of the variable gain amplifiers.

20 Claims, 3 Drawing Sheets

TRANSMISSION POWER CONTROL IN A SATELLITE COMMUNICATION SYSTEM

FIELD OF THE INVENTION

The present invention pertains to power control in a communications system such as a communications satellite system. More particularly, the present invention pertains to control of the power distribution among downlink beams in a multiple beam communications satellite utilizing linearized traveling wavetube amplifiers (TWTAs).

BACKGROUND OF THE INVENTION

Conventional communications satellites, such as transponding satellites, which utilize a non-linear power amplifier in the transmitter, operate that amplifier at or near saturation where the non-linear power amplifier is most efficient. Using power control with such a non-linear amplifier results in an unacceptable loss in efficiency. To overcome this, such communications satellites generally use linearized traveling wave tube amplifiers (TWTAs). To assure adequate reception of the downlinked signals from the satellite, the TWTAs generally have the same power levels, and the satellites generally provide the same power to each TWTA. However, uniform power levels are not necessarily needed for all of the downlink beams.

Further, the TWTAs are frequently oversized to compensate for attenuation, for example due to rain or other inclement conditions. The power is then reduced when there is no rain or other attenuation-causing condition. The satellites generally get their power from solar cells or other sources carried on the satellite. Making excess power available thus requires excess solar cells, which results in increased weight on the satellite. This not only is costly in providing the additional solar cells, but also costly by making launching of the satellite into orbit more expensive.

SUMMARY OF THE INVENTION

The present invention pertains to a communications system including a multi-transmitter communications station capable of controlling the power to transmitters in the communications station, and to a method of controlling the power to transmitters in such a communications station, to a storage medium having stored thereon instructions for controlling the power to transmitters in such a communications satellite.

In accordance with the method of the present invention, the power being consumed by each of the transmitters in the communications station is determined, and a desired power setting is determined for each of the transmitters. The power being consumed is compared with the desired power settings to determine whether the present power settings are proper. If the present power settings are not proper, then it is determined whether the power needed for the desired power settings is available. If so, then the power settings are adjusted to provide the desired power settings. If the power needed to provide the desired power settings is not available, then the load priorities of the transmitters are determined, and if there is sufficient power to provide power for the determined load priorities, the power settings are adjusted to provide power based on the load priorities.

A storage medium in accordance with the present inventions stores instructions for controlling the power to the transmitters in a communications satellite in accordance with this method.

A communications station in accordance with the present invention includes a plurality of variable gain amplifiers for amplifying respective input signals to provide intermediate signals; a plurality of high gain amplifiers for amplifying the intermediate signals from the variable gain amplifiers to provide output signals; a plurality of transmitting antennae for transmitting the output signals from the high gain amplifiers to a plurality of receiving stations; a plurality of monitoring power supplies for providing voltages to the high gain amplifiers and for monitoring the current in each of the high gain amplifiers, permitting determination of the power provided to the output signals by the high gain amplifiers; and a power profile processor responsive to a desired power setting signal from one of the receiving stations for providing a gain signal to the one of the variable gain amplifiers associated with the one of the receiving stations to adjust the gain of the one of the variable gain amplifiers so as to adjust the power provided to the output signal of the high gain amplifier associated with the one of the variable gain amplifiers.

A communications system in accordance with the present invention includes a signal source for providing a plurality of input signals; a plurality of signal receiving stations; and a communications station of the above type.

BRIEF DESCRIPTION OF THE DRAWINGS

These and other aspects and advantages of the present invention are more apparent then the following detailed description and claims, particularly when considered in conjunction with the accompanying drawings. In the drawings:

DETAILED DESCRIPTION OF PREFERRED EMBODIMENTS

Figure 1:
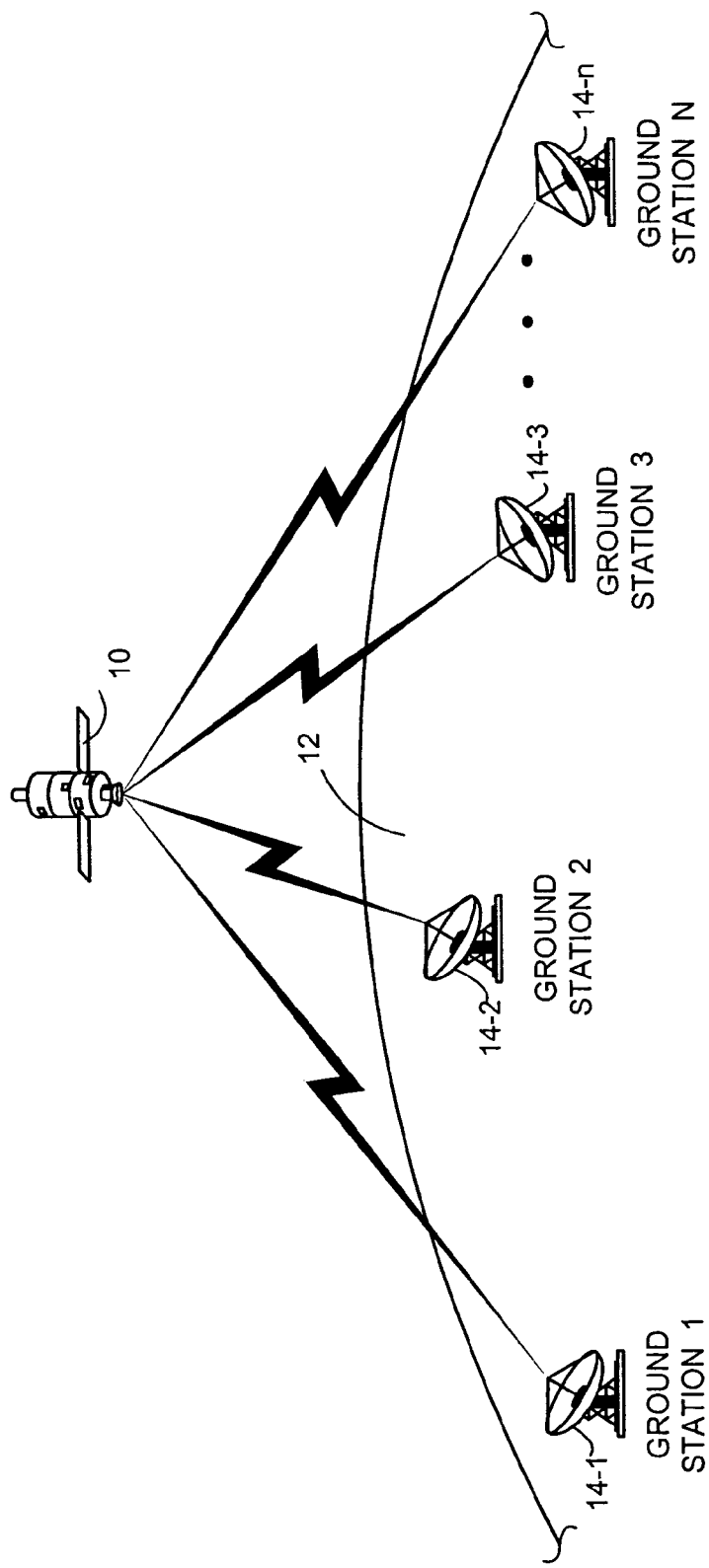
FIG. 1 is a schematic representation of a preferred embodiment of a communications system operating in accordance with the present invention.

FIG. 1 is a schematic representation of a preferred embodiment of a communications system operating in accordance with the present invention. A satellite 10 is operating in an earth orbit above the surface of the earth 12. A plurality of ground stations 14-1, 14-2, 14-3 . . . 14-n are capable of communication through satellite 10. Thus, for example, ground station 14-1 might transmit a signal including a plurality of messages to satellite 10. Satellite 10 processes these messages and relays separate messages to appropriate ones of the ground stations 14-2, 14-3 . . . 14-n, as well as to other ground stations. Likewise, any of ground stations 14-2, 14-3 . . . 14-n might transmit a signal to satellite 10 with messages that are relayed to other ground stations.

Figure 2:
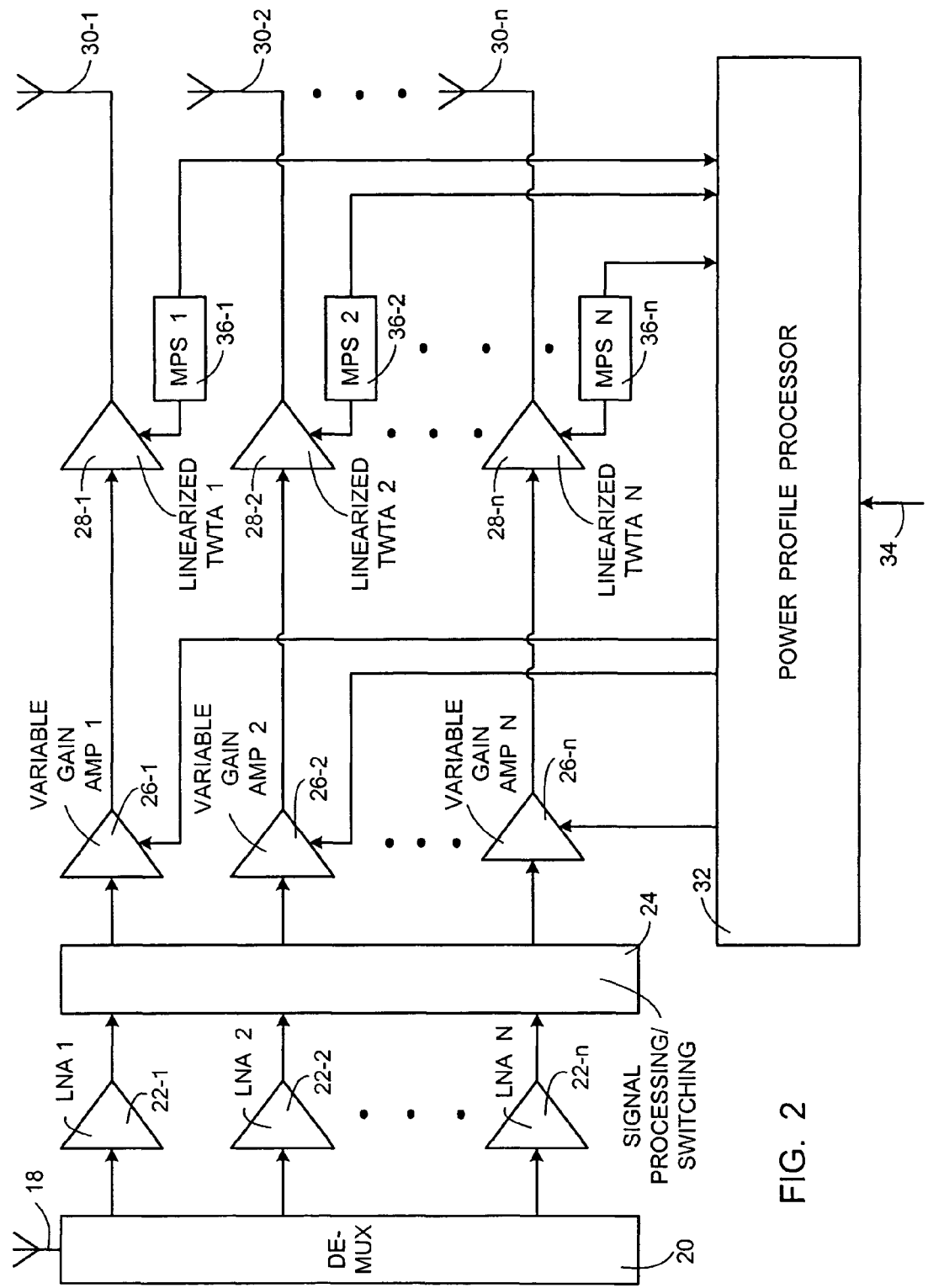
FIG. 2 is a block diagram of a preferred embodiment of a communications station in accordance with the present invention.

FIG. 2 is a block diagram of a communications station such as might be provided in satellite 10 to receive the messages from ground stations 14-1, process those messages, and relay them to ground stations 14-2, 14-3 . . . 14-n.

The communications station includes a receiving antenna 18 which receives the messages from ground station 14-1 and applies the several messages to a demultiplexor 20 which separates the several messages. The several messages are applied through respective low noise amplifiers 22-1, 22-2 . . . 22-n to a signal processing and switching system 24. Signal processing and switching system 24 provides necessary processing for the signals, including for example filtering, power combining, and cross beam switching. From signal processing and switching system 24, the signals are applied through respective variable gain amplifiers 26-1, 26-2 . . . 26-n to respective linearized TWTAs 28-1, 28-2 . . . 28-n which apply the signals to respective transmitting antennas 30-1, 30-2 . . . 30-n for transmission to the respective receiving grounds stations 14-1, 14-2 . . . 14-n.

Power profile processor 32 receives signals on a command and control channel 34 from a controlling ground station and provides gain control signals to the respective variable gain amplifiers 26-1, 26-2 . . . 26-n. Respective monitoring power supplies or electronic power converters 36-1, 36-2 . . . 36-n provide voltages to the respective TWTAs 28-1, 28-2 . . . 28-n and monitor the current drawn by the respective TWTAs, enabling the electronic power converters to provide power profile processor 32 with readings of the power consumed by the respective TWTAs.

Figure 3:
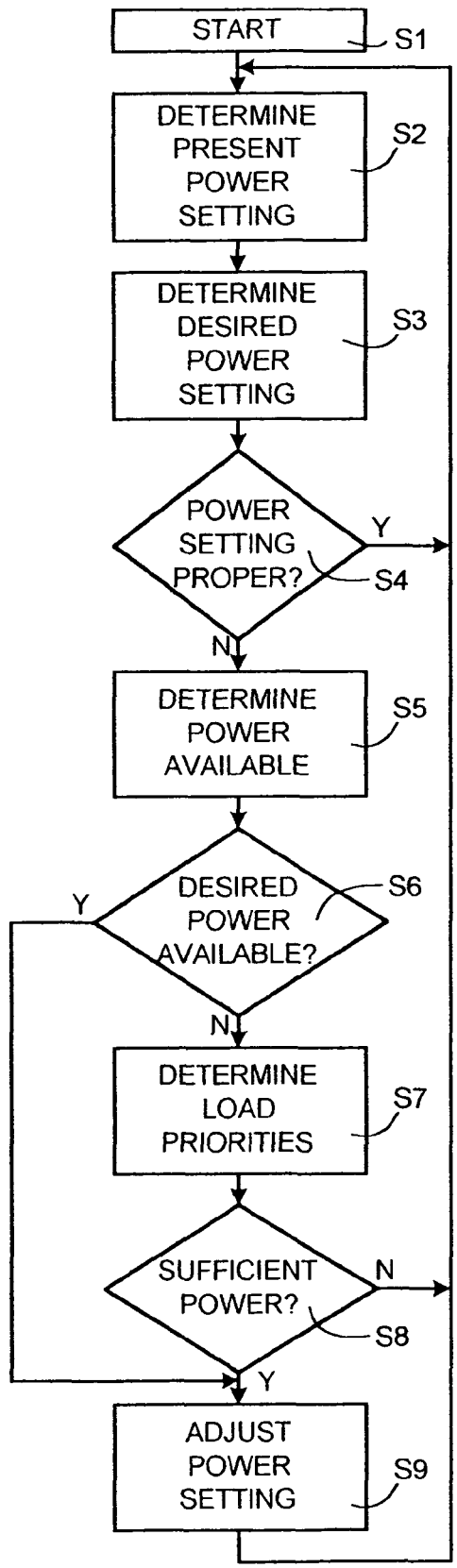
FIG. 3 is a flowchart of a preferred embodiment of a method of controlling the power to transmitters in a multi-transmitter communications station in accordance with the present invention; and Each of FIG. 4

FIG. 3 is a flowchart of a preferred embodiment of a method of controlling the power to transmitters in a multi-transmitter communications station in accordance with the present invention. The method starts in step S1. In step S2, power profile processor 32 determines the power consumed by a TWTA, for example TWTA 28-1. This determination is based on the voltage being supplied to the TWTA by its electronic power converter 36-1 and the current flowing in the TWTA as monitored by the electronic power converter 36-1. In step S3, power profile processor 32 determines the desired power setting based on signals received on command and control channel 34 from the ground station. In step S4, power profile processor compares the power consumed with the desired power setting to determine whether the present power setting is proper. If so, the method returns to step S2. If step S4 determines that the present power setting is not proper, then in step S5 power profile processor determines the amount of power available, and in step S6 power profile processor determines whether there is sufficient power available to provide the desired power as determined in step S3. That is, power profile processor determines whether the communications station power supply has the capacity to provide power of the desired power setting for all of the TWTAs at the communications station. If so, then the method advances to step S9, and power profile processor 32 adjusts the power setting for the respective TWTA, and the method returns to step S2. If step S6 determines that the needed power is not available, then in step S7 power profile processor 32 determines the load priorities for the several TWTAs. Some of the outgoing signals might be of a high priority, while others are of a lower priority. In such instance, each TWTA handling a higher priority signal gets a higher load priority, and power profile processor 32 adjusts the gain of the variable gain amplifier 26 associated with that TWTA accordingly. Similarly, step S4 might determine that more power than needed is being provided to a particular TWTA and so in step S7 it will be determined that the gain of the associated variable gain amplifier 26 can be reduced.

Once the load priorities are determined in step S7, in step S8 it is determined whether with the load priorities set for the minimum power requirements of each TWTA there is sufficient power to provide the power called for by these load priorities. If so, then the method proceeds to step S9, and the power settings are adjusted in accordance with the load priorities. The method then returns to step S2. If step S8 determines that there is not sufficient power to provide for the load priorities, then the method returns to step S2 without adjusting the power.

Figure 4:
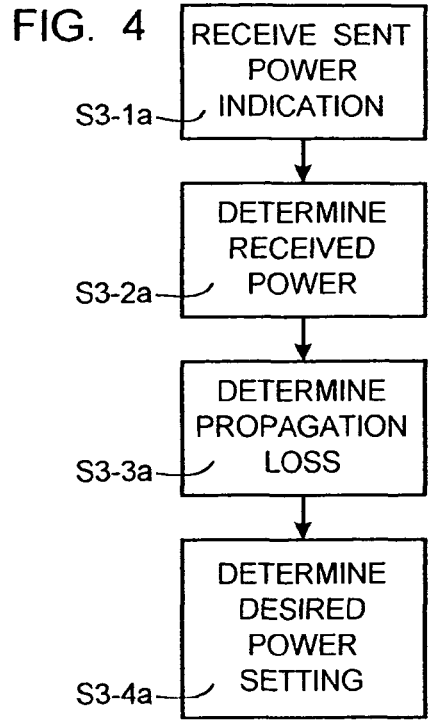

FIG. 4 is a flowchart of a first embodiment of a method of determining the desired power setting in step S3 of FIG. 3. In step S3-1*a* the ground station receives a sent power indication, indicating the power level of the signal as sent by the communications station within satellite 10. By way of example, the communications station might send a rain fade beacon indicating the power sent. In step S3-2*a*, the ground station determines the power in the received signal. From these two values, the ground station determines the propagation loss in step S3-3*a*. Then in step S3-4*a*, the ground station determines the desired power setting to give the desired received power.

Figure 5:
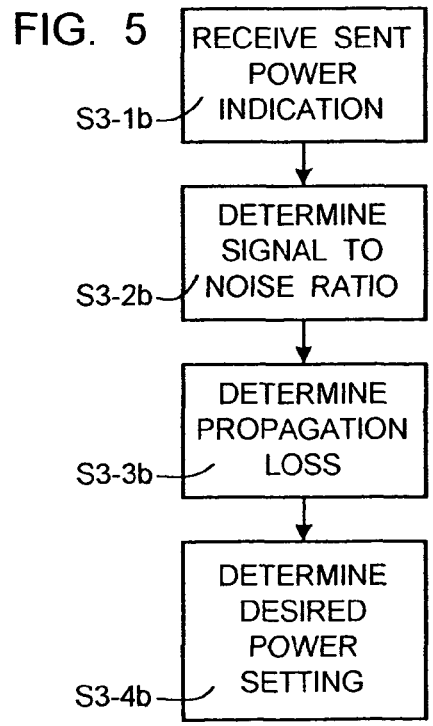
FIG. 5 is a flowchart of an embodiment of a method of determining a desired power setting for a TWTA in accordance with the present invention.

FIG. 5 is a flowchart of a second embodiment of a method of determining the desired power setting in step S3 of FIG. 3. In step S3-1*b*, the ground station receives a sent power indication. In step S3-2*b*, the ground station determines the signal to noise ratio in the received signal. In step S3-3*b* the ground station determines the propagation loss from the signal to noise ratio. Then in step S3-4*b*, the ground station determines the desired power setting to give the desired received power.

Other techniques might also be utilized to determine the desired power setting in step S3, for example utilizing the number of uncorrected errors in the received signal or the number of errors detected in the signal. Any other appropriate measure of system performance might also be utilized, particularly one that can be mathematically related to the transmitted power from the communications station. Likewise, the received power indication or the signal to noise ratio indication as determined in step S3-2*a* or S3-2*b* might be uplinked to satellite 10, and the desire power setting determined within power profile processor 32.

The present invention thus permits improved control of the power utilized by the transmitters of a multi-transmitter communications station so as to reduce the overall power requirements. While the invention has been described with reference to a satellite communications system, the invention is applicable to ground based communication systems as well. Although the invention has been described with reference to preferred embodiments, alterations, rerrangements, and substitutions could be made, and still the result would be within the scope of the invention.

What is claimed is:

1. A method of controlling the power to transmitters in a multi-transmitter communications station, said method comprising determining the power being consumed by each of the transmitters; determining a desired power setting of each of the transmitters; comparing the power being consumed with the desired power settings to determine whether the present power settings are proper; and if the present power settings are not proper, then:

determining whether the power needed for the desired power settings is available;

if the power needed for the desired power settings is available, adjusting the power settings to provide the desired power settings; and if the power needed for the desired power settings is not available, determining load priorities of the transmitters, and if there is sufficient power for the determined load priorities, adjusting the power settings to provide power based on the load priorities.

2. A method as claimed in claim 1, wherein the desired power setting of each of the transmitters is determined by receiving a sent power indication of the transmitter; determining the power received from the transmitter; determining the propagation loss for the transmitter based on the sent power indication and the received power; and determining the desired power setting based on the propagation loss.

3. A method as claimed in claim 1, wherein the desired power setting of each of the transmitters is determined by receiving a sent power indication of the transmitter; determining a signal to noise ratio of the transmitter; determining the propagation loss for the transmitter based on the signal to noise ratio; and determining the desired power setting based on the propagation loss.

4. An article, comprising a storage medium having instructions stored thereon, the instructions when executed controlling the power to transmitters in a multi-transmitter communications station by determining the power being consumed by each of the transmitters; determining a desired power setting of each of the transmitters; comparing the power being consumed with the desired power settings to determine whether the present power settings are proper; and if the present power settings are not proper, then determining whether the power needed for the desired power settings is available; if the power needed for the desired power settings is available, adjusting the power settings to provide the desired power settings; and if the power needed for the desired power settings is not available, determining load priorities of the transmitters, and if there is sufficient power for the determined load priorities, adjusting the power settings to provide power based on the load priorities.

5. An article as claimed in claim 4, wherein the instructions when executed determine the desired power setting by receiving a sent power indication of the transmitter; determining the power received from the transmitter; determining the propagation loss for the transmitter based on the sent power indication and the received power; and determining the desired power setting based on the propagation loss.

6. An article as claimed in claim 4, wherein the instructions when executed determine the desired power setting by receiving a sent power indication of the transmitter; determining a signal to noise ratio of the transmitter; determining the propagation loss for the transmitter based on the signal to noise ratio; and determining the desired power setting based on the propagation loss.

7. A communications station, comprising:
a plurality of variable gain amplifiers for amplifying respective input signals to provide intermediate signals;
a plurality of high gain amplifiers for amplifying the intermediate signals from said variable gain amplifiers to provide output signals;
a plurality of transmitting antennae for transmitting the output signals from said high gain amplifiers to a plurality of receiving stations;
a plurality of monitoring power supplies for providing a voltage to each of said high gain amplifiers and for monitoring the current in each of said high gain amplifiers, permitting determination of the power provided to the output signals by said high gain amplifiers; and
a power profile processor responsive to a desired power setting signal from one of the receiving stations for providing a gain signal to one of said variable gain amplifiers associated with said one of the receiving stations to adjust the gain of said one of said variable gain amplifiers so as to adjust the power provided to the output signal of the high gain amplifier associated with said one of said variable gain amplifiers.

8. A communications station as claimed in claim 7, wherein each of said high gain amplifiers comprises a traveling wave tube amplifier.

9. A communications station as claimed in claim 7, further comprising an input circuit for providing the input signals.

10. A communications station as claimed in claim 9, wherein said input circuit comprises a receiving antenna for receiving a composite input signal from a transmitter, and a demultiplexor for separating the composite input signal into the respective input signals and applying the respective input signals to the variable gain amplifiers.

11. A communications station as claimed in claim 10, wherein said input circuit further comprises a plurality of low noise amplifiers for amplifying the respective input signals from the demultiplexor and applying the resulting signals to the variable gain amplifiers.

12. A communications station as claimed in claim 11, wherein said input circuit further comprises a signal processing circuit for processing the respective input signals from the low noise amplifiers and applying the respective processed signals to the variable gain amplifiers.

13. A communications station as claimed in claim 7, wherein said variable gain amplifiers, said high gain amplifiers, said transmitting antennas, said monitoring power supplies, and said power profile processor are within a communications satellite.

14. A communications system, comprising a signal source for providing a plurality of input signals; a plurality of signal receiving stations; and a communications station, wherein said communications station, comprises:
a plurality of variable gain amplifiers for amplifying the plurality of input signals to provide intermediate signals;
a plurality of high gain amplifiers for amplifying the intermediate signals from said variable gain amplifiers to provide output signals;
a plurality of transmitting antennae for transmitting the output signals from said high gain amplifiers to said plurality of receiving stations;
a plurality of monitoring power supplies for providing a voltage to each of said high gain amplifiers and for monitoring the current in each of said high gain amplifiers, permitting determination of the power provided to the output signals by said high gain amplifiers; and
a power profile processor responsive to a desired power setting signal from one of said receiving stations for providing a gain signal to one of said variable gain amplifiers associated with said one of said receiving stations to adjust the gain of said one of said variable gain amplifiers so as to adjust the power provided to the output signal of the high gain amplifier associated with said one of said high gain amplifiers.

15. A communications system as claimed in claim 14, wherein each of said high gain amplifiers comprises a traveling wave tube amplifier.

16. A communications system as claimed in claim 14, further comprising an input circuit for providing the input signals.

17. A communications system as claimed in claim 16, wherein said input circuit comprises a receiving antenna for receiving a composite input signal from a transmitter, and a demultiplexor for separating the composite input signal into respective input signals and applying the respective input signals to the variable gain amplifiers.

18. A communications system as claimed in claim 17, wherein said input circuit further comprises a plurality of low noise amplifiers for amplifying the respective input signals from the demultiplexor and applying the resulting signals to the variable gain amplifiers.

19. A communications system as claimed in claim 18, wherein said input circuit further comprises a signal processing circuit for processing the respective input signals from the low noise amplifiers and applying the respective processed signals to the variable gain amplifiers.

20. A communications system as claimed in claim 14, wherein said communication station is within a communications satellite.

* * * * *